United States Patent
Lee

(10) Patent No.: US 7,352,754 B2
(45) Date of Patent: Apr. 1, 2008

(54) ATM-BASED DATA TRANSMITTING AND RECEIVING DEVICE AND METHOD

(75) Inventor: Tae Jae Lee, Kwangmyung-si (KR)

(73) Assignee: LG Electronics Inc., Seoul (KR)

( * ) Notice: Subject to any disclaimer, the term of this patent is extended or adjusted under 35 U.S.C. 154(b) by 802 days.

(21) Appl. No.: 10/701,474

(22) Filed: Nov. 6, 2003

(65) Prior Publication Data

US 2004/0125804 A1 Jul. 1, 2004

(30) Foreign Application Priority Data

Dec. 27, 2002 (KR) ........................ 10-2002-0085365

(51) Int. Cl.
*H04L 12/28* (2006.01)
*H04L 12/56* (2006.01)

(52) U.S. Cl. ............... 370/397; 370/395.1; 370/395.6; 370/395.63

(58) Field of Classification Search ..................... None
See application file for complete search history.

(56) References Cited

U.S. PATENT DOCUMENTS

| 6,134,246 | A | * | 10/2000 | Cai et al. ..................... 370/474 |
| 6,189,042 | B1 | * | 2/2001 | Keller-Tuberg ............. 709/238 |
| 7,190,667 | B2 | * | 3/2007 | Susnow et al. ............. 370/229 |

* cited by examiner

*Primary Examiner*—Ronald Abelson
(74) *Attorney, Agent, or Firm*—Ked & Associates, LLP

(57) ABSTRACT

A data transmitting and receiving device, which transmits and receives ATM cells between the calculation processing modules is described. The ATM-based data transmitting and receiving device includes a transmitting means and a data receiving means. The data receiving means includes a memory controller for controlling storage of successively received ATM cells in corresponding cell buffers, and a memory controlled by it. The memory includes a linked cell buffer, a free cell buffer identifier queue, a receiving state table and a receiving completion state queue. Accordingly, a separate device (e.g., ASIC chip) can be used to transmit and receive ATM cells instead of the conventional calculation processing module so that the transmission efficiency of the ATM cell can be increased and the load of the calculation processing device can be reduced.

27 Claims, 10 Drawing Sheets

ATM-BASED DATA TRANSMITTING AND RECEIVING DEVICE AND METHOD

BACKGROUND OF THE INVENTION

1. Field of the Invention

The present invention relates to a communication device, and more particularly, to an ATM-based data transmitting and receiving device.

2. Background of the Related Art

Generally, asynchronous transmission mode (ATM) is a packet-oriented transmission mode using an asynchronous time division multiplexing technology. A packet is called a cell and has a fixed size.

An example of an ATM cell is shown in FIG. 1. The ATM cell consists of 53 bytes. The header is 5 bytes and the remaining 48 bytes are a payload in which data to be transmitted is loaded. The header includes two quantities, a Virtual Path Identifier (VPI) and a Virtual Channel Identifier (VCI) that are used to recognize an ATM network connection in which cells are transmitted. The VPI represents a main path set between two exchange nodes and the VCI represents one specific connection portion on each main path.

Referring to a protocol standard model, ATM comprises a physical layer, ATM layer, ATM adaptation layer (AAL) and a higher layer. The ATM layer supports various kinds of services, which have different traffic characteristics and different system requirements. To accomplish this, applications of other classes are adapted. It is the AAL that performs this function.

The AAL is classified into four classes according to types of service. In other words, the classes are AAL1, AAL2, AAL3, AAL4 and AAL5. Among them, AAL3 and AAL4 are combined into AAL3/4. Referring to AAL3/4, this class is made for a service that needs variable speed for both of connection-oriented and non-connectional services. Originally, The AAL3/4 was divided into AAL3 and AAL4 but these two classes are combined into one AAL, i.e., AAL3/4.

AAL5 is a class that supports a connection-oriented service that has a variable transmission rate. The AAL5 is a simplified version of AAL3/4. In the AAL5, error correction and retransmission functions are omitted. Accordingly, the overhead portion of the bandwidth is reduced, process requirements are simplified and complexity of configuration is reduced.

The above-mentioned AAL is divided into a convergence sublayer (CS) and a segmentation and reassembly (SAR) sublayer. The CS is divided into common part CS (COCS) and service specific part CS (SSCS).

FIG. 2 illustrates a related art ATM-based data transmitting and receiving device. Referring to FIG. 2, the related art data transmitting and receiving device includes a first calculation processing module 10 for dividing a message to generate and transmit ATM cells. An ATM switch module 20 is used for switching the ATM cells received from the first calculation processing module 10 to the corresponding path using the VPI/VCI. A second calculation processing module 30 is used for receiving the switched ATM cells and restoring a message. Each of the first and second calculation processing modules 10 and 30 can generate ATM cells from the message and restore the message from the ATM cells. Accordingly, the second calculation processing module 30 can also generate ATM cells from the message and transmit them to the ATM switch module 20. Likewise, the first calculation processing module 10 can also restore the message from the ATM cells received from the ATM switch module 20.

In this manner, each calculation processing module of the related art data transmitting and receiving device divides the message, generates ATM cells, and restores the message from the ATM cells. Accordingly, if these calculation processing modules are employed in a communication network, the calculation processing modules can be a bottleneck due to the limited processing capability and large processing load from receiving and processing messages from a large number of nodes.

SUMMARY OF THE INVENTION

An object of the invention is to solve at least the above problems and/or disadvantages and to provide at least the advantages described hereinafter.

Accordingly, an object of embodiments of the present invention is to reduce load on a processing module.

An object is to use separate means for transmitting and receiving ATM cells.

Additional advantages, objects, and features of the invention will be set forth in part in the description which follows and in part will become apparent to those having ordinary skill in the art upon examination of the following or may be learned from practice of the invention.

To achieve these objects and other advantages and in accordance with embodiments of the invention, as embodied and broadly described herein, an ATM-based data transmitting and receiving device includes a transmitting means including a transmission data storage unit for storing data received from a calculation processing module, a cell generator for dividing message stored in the transmission data storage unit into a predetermined amount of data, combining cell data made using VPI/VCI information attached to the message according to each of the data and generating at least one ATM cell, and a cell transmitter for transmitting at least one ATM cell generated at the cell generator to an ATM switch module; and a data receiving means including a cell receiver for receiving at least one ATM cell switched by the ATM switch module, a memory controller for controlling to store the at least one ATM cell received by the cell receiver to a corresponding cell buffer according to a cell buffer identifier, a memory for storing the at least one ATM cell according to control of the memory controller, a data restoring unit for successively withdrawing the at least one ATM cell using the cell buffer identifier and restoring the message, and a receiving data storage unit for storing the message restored by the data restoring unit.

The cell generator divides data using a read counter initialized according to message length information attached to the message. The memory includes: a linked cell buffer for storing one ATM cell and an identifier to a next linked cell buffer every cell buffer identifier; a free cell buffer identifier queue for storing at least one cell buffer identifier indicating an empty linked cell buffer; a receiving state table including information used in classifying and managing the ATM cell according to VPI/VCI; and a receiving completion state queue for copying some of information of the receiving state table updated when all the ATM cells to constitute one message are stored.

The memory controller ascertains whether or not to approve the reception of the at least one ATM cell using the receiving permission information of the receiving state table corresponding to VPI/VCI information attached to the at least one ATM cell, and stores the at least one ATM cell in the linked cell buffer using a cell buffer identifier withdrawn from a free cell buffer identifier queue. The data restoring unit withdraws a start cell buffer identifier from a receiving completion state queue, stores corresponding data stored in a cell buffer to which a start cell buffer identifier indicates in the receiving data storage unit, and decreases cell number information of a receiving completion state queue by one.

In another aspect of an embodiment of the present invention, an ATM-based data transmitting and receiving method includes the step of (a) whenever data are fetched one byte by one byte from a message received from a first calculation processing module, reducing a message length value included in the message one by one; (b) generating at least one ATM cell by repeatedly performing a process of combining a cell header made in 48-byte data using VPI/VCI information included in the message until the message length value gets to 0; (c) transmitting the at least one ATM cell to an ATM switch module to perform a switching; (d) receiving the at least one switched ATM cell successively and storing the at least one ATM cell in each cell buffer using a cell buffer identifier that was previously stored; (e) withdrawing the at least one ATM cell successively using the cell buffer identifier, restoring original message, and informing a second calculation module of the restoration.

The step (d) includes the steps of: (d-1) when a first ATM cell of the at least one ATM cell is received, ascertaining whether or not the reception of the first ATM cell is approved; (d-2) when the reception of the first ATM cell is approved, storing the first ATM cell in a cell buffer indicated by a cell buffer identifier withdrawn from a free cell buffer identifier queue, increasing a number of the cell by 1, and storing the number of the cell along with the one cell buffer identifier in a receiving state table; (d-3) when a PT information included in the first ATM cell is 0, storing a second ATM cell following the first ATM cell in a cell buffer indicated by another cell buffer identifier withdrawn from the free cell buffer identifier, increasing the number of the cell by 1, and storing the number of the cell and another cell buffer identifier in the receiving state table; and (d-4) repeatedly performing the step (d-3) until the ATM cell whose PT information is set to 1 exists.

The step (e) includes the steps of (e-1) when all the at least one ATM cell is stored, withdrawing a first ATM cell using the one cell buffer identifier, storing the withdrawn first ATM cell in a receiving data storage unit, reducing a number of the cell by 1, and returning the one cell buffer identifier to the free cell buffer identifier queue; (e-2) withdrawing a second cell using another cell buffer identifier stored in a next linked cell buffer identifier area which is provided to a cell buffer in which the first ATM cell is stored, storing the withdrawn second cell in the receiving data storage unit, reducing a number of the cell by 1, and returning the other cell buffer identifier to the free cell buffer identifier queue; and (e-3) repeatedly performing the step (e-2) until the number of the cell gets to 0.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
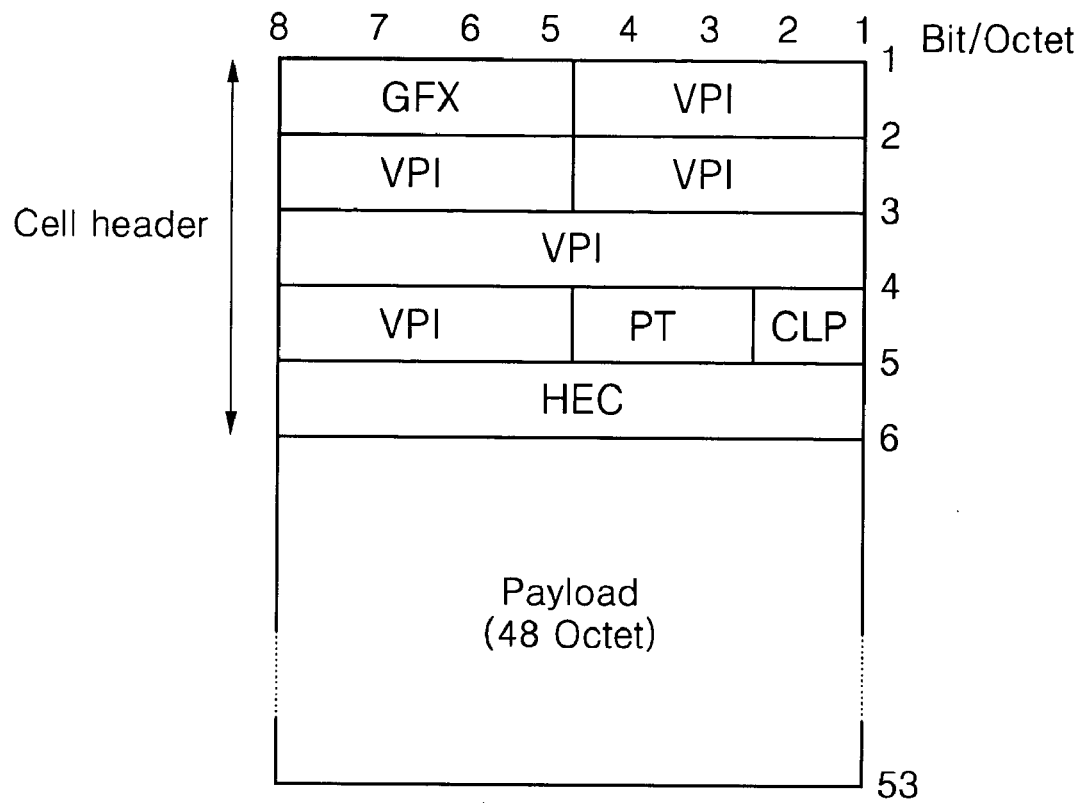
FIG. 1 illustrates a format of a general ATM cell.
Figure 2:
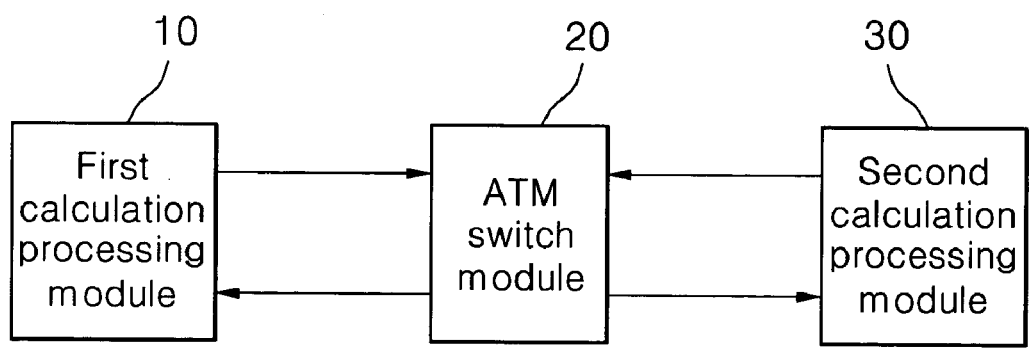
FIG. 2 illustrates a related art ATM-based data transmitting and receiving device.
Figure 3:
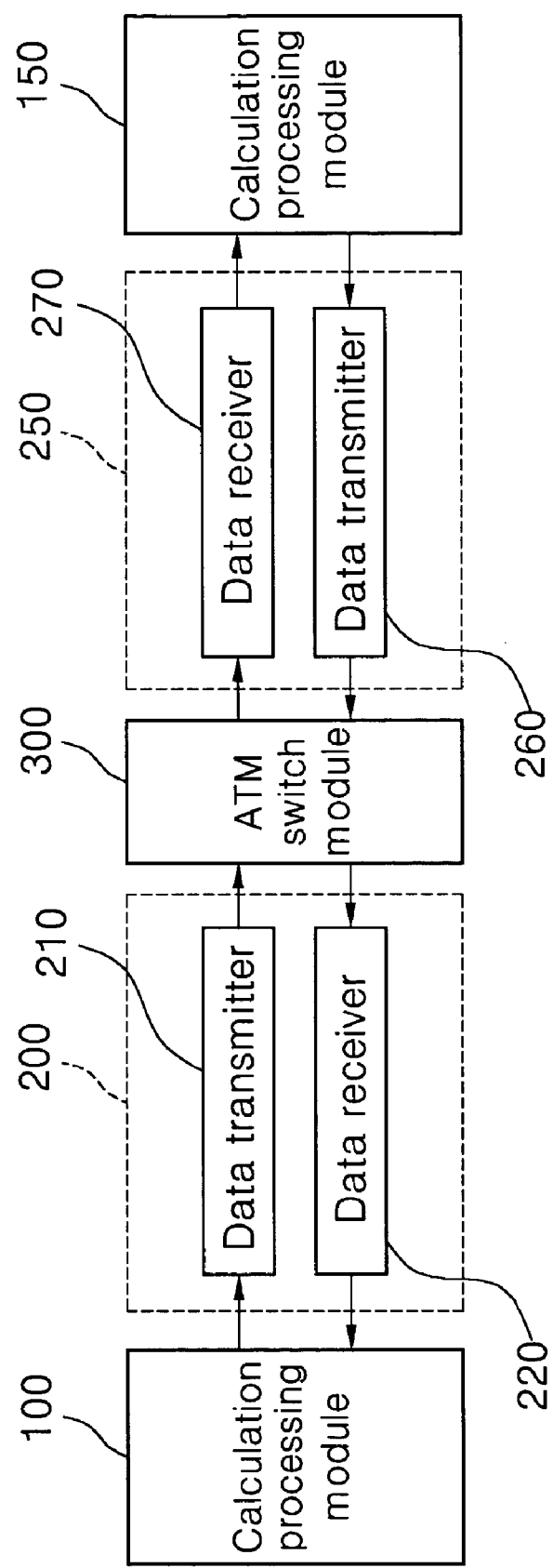
FIG. 3 illustrates an ATM-based data transmitting and receiving device according to an embodiment of the present invention.
Figure 4:
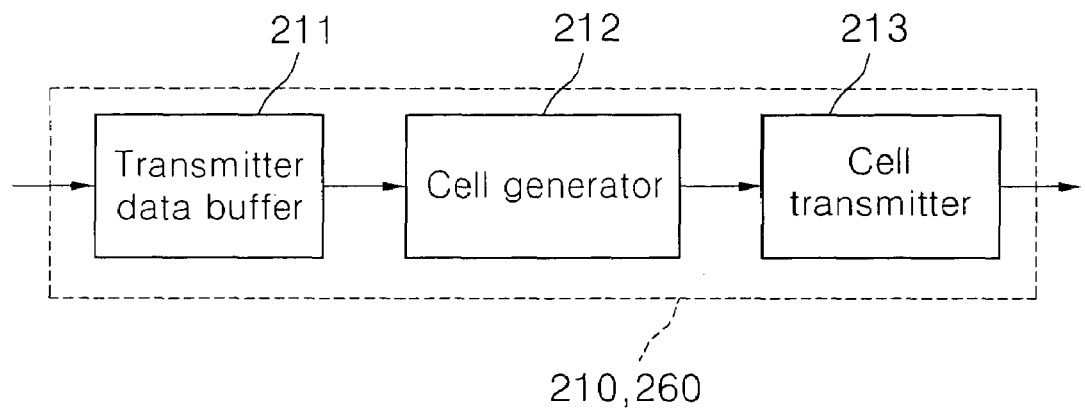
FIG. 4 illustrates a configuration of the data transmitting unit shown in FIG. 3.
Figure 5:
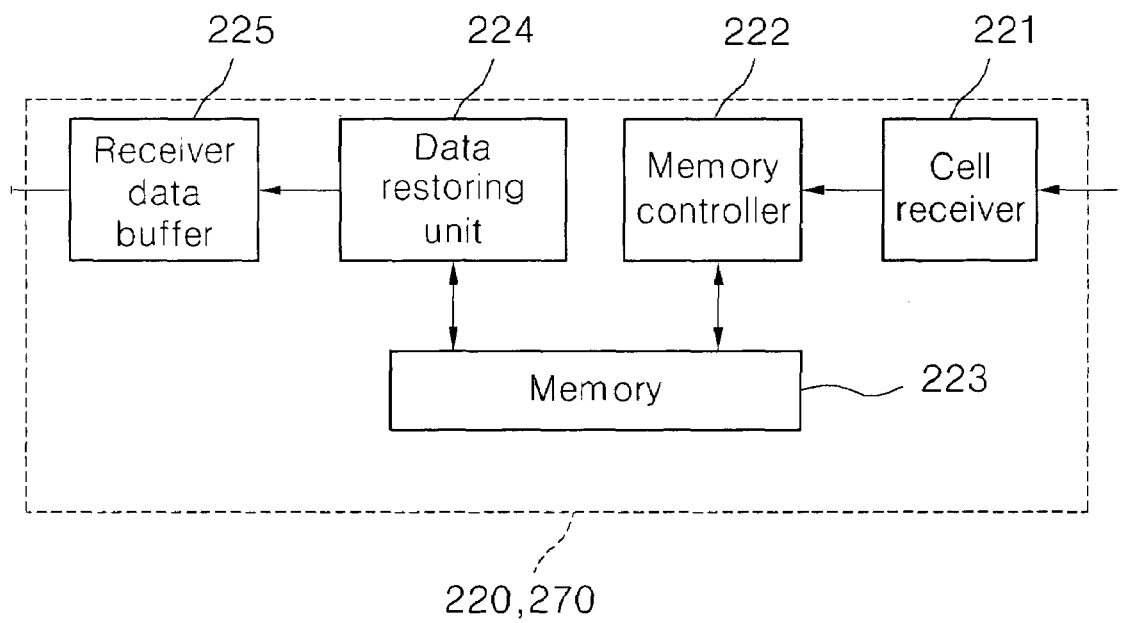
FIG. 5 illustrates a configuration of the data receiving unit shown in FIG. 3.
Figure 6:
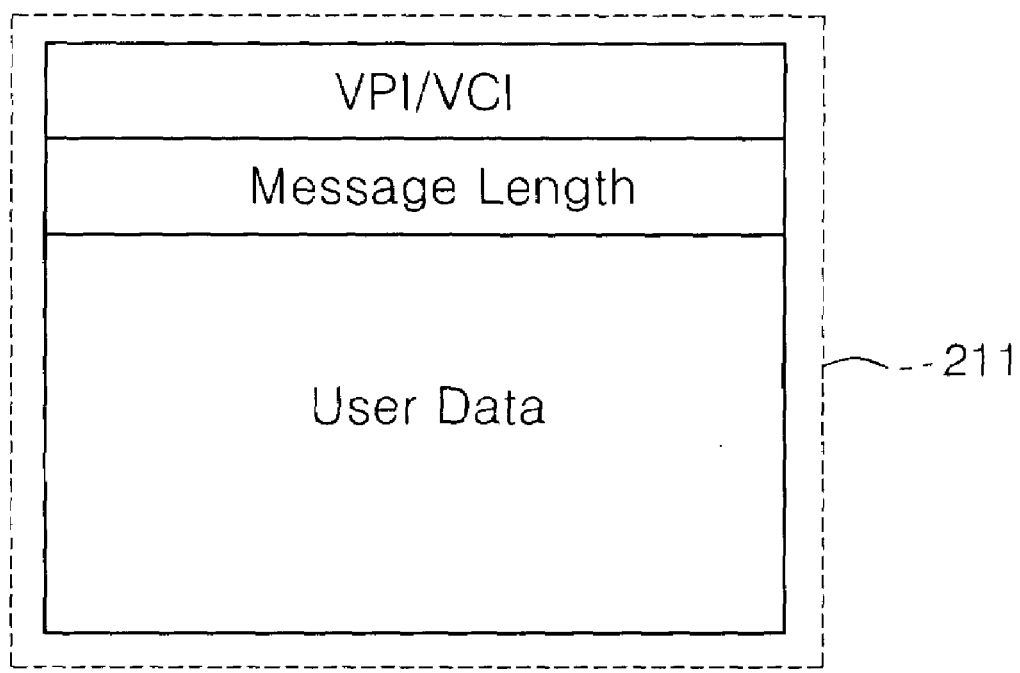
FIG. 6 illustrates a format of data stored in the transmitter data buffer shown in FIG. 3.

FIG. 3 illustrates an ATM-based data transmitting and receiving device according to an embodiment of the present invention. FIG. 4 illustrates a configuration of the data transmitting unit shown in FIG. 3. FIG. 5 illustrates a configuration of the data receiving unit shown in FIG. 3. FIG. 6 illustrates a format of data stored in the transmitter data buffer shown in FIG. 3.

Referring to FIG. 3, the data transmitting and receiving device of an embodiment of the present invention includes calculation processing modules 100 and 150, transmitting and receiving modules (or data communication modules) 200 and 250, and an ATM switch module 300 for switching ATM cells received from the transmitting and receiving modules 200 and 250 using the VPI/VCI. The transmitting and receiving modules 200 and 250 restore the message from the ATM cell, which is provided from the ATM switch module 300, and transmits the restored message to the calculation processing modules 100 and 150, respectively.

The calculation processing modules 100 and 150 transmit/receive messages with predetermined size (for example, 476 bytes) to/from the transmitting and receiving modules 200 and 250 through a global bus. The global bus functions as a pathway to simultaneously transfer data (e.g., voice and CPU messages processed by the system), The global bus can be connected to a STM-1 SONET framer in a manner of utopia interface level 1.

The transmitting and receiving modules 200 and 250 include data transmitting unit 210 and 260, respectively, for dividing the message received from the calculation processing modules 100 and 150 by a predetermined size. Data units 210 and 260 also generate the ATM cell and transmit the ATM cell to the ATM switch module 300 and data receiving units 220 and 270, respectively. Data receiving units 220 and 270 restore the original message from the ATM cell received from the ATM switch module 300 and transmit the restored message to the calculation processing modules 100 and 150, respectively.

As illustrated in FIG. 4, each of the data transmitting units 210 and 260 includes a transmitter data buffer 211, a cell generator 212 and a cell transmitter 213. The transmitter data buffer 211 stores the message received from a calculation processing module 100 and 150, respectively. The format of the message stored in the transmitter data buffer 211 includes VPI/VCI area, message length area and user data area as shown in FIG. 6.

The VPI/VCI is information representing the source and destination of the message. The message length information is a sum of the number of bytes corresponding to the size of the message length area and the number of bytes corresponding to size of the user data area. Accordingly, the VPI/VCI information, the message length information and the user data information of the message received from the calculation processing module 100 and 150 are stored in the VPI/VCI information area, the message length area and the user data area, respectively.

The cell generator 212 initializes a read counter value using the message length information stored in the message length area, divides the data stored in the user data area into 48-byte units, combines the cell header that is made using the VPI/VCI information, and generates at least one ATM cell. The cell generator 212 decreases the read counter value by 1, whenever one byte of data is read from the user data area, which is read one byte at a time. This operation is repeated until the read counter value goes to 0. Accordingly, The cell generator 212 divides the data read from the user data area into 48-byte units to generate cells, combines a cell header (CH) with the 48-byte units, generates ATM cells, and provides the ATM cells to the cell transmitter 213.

Figure 7:
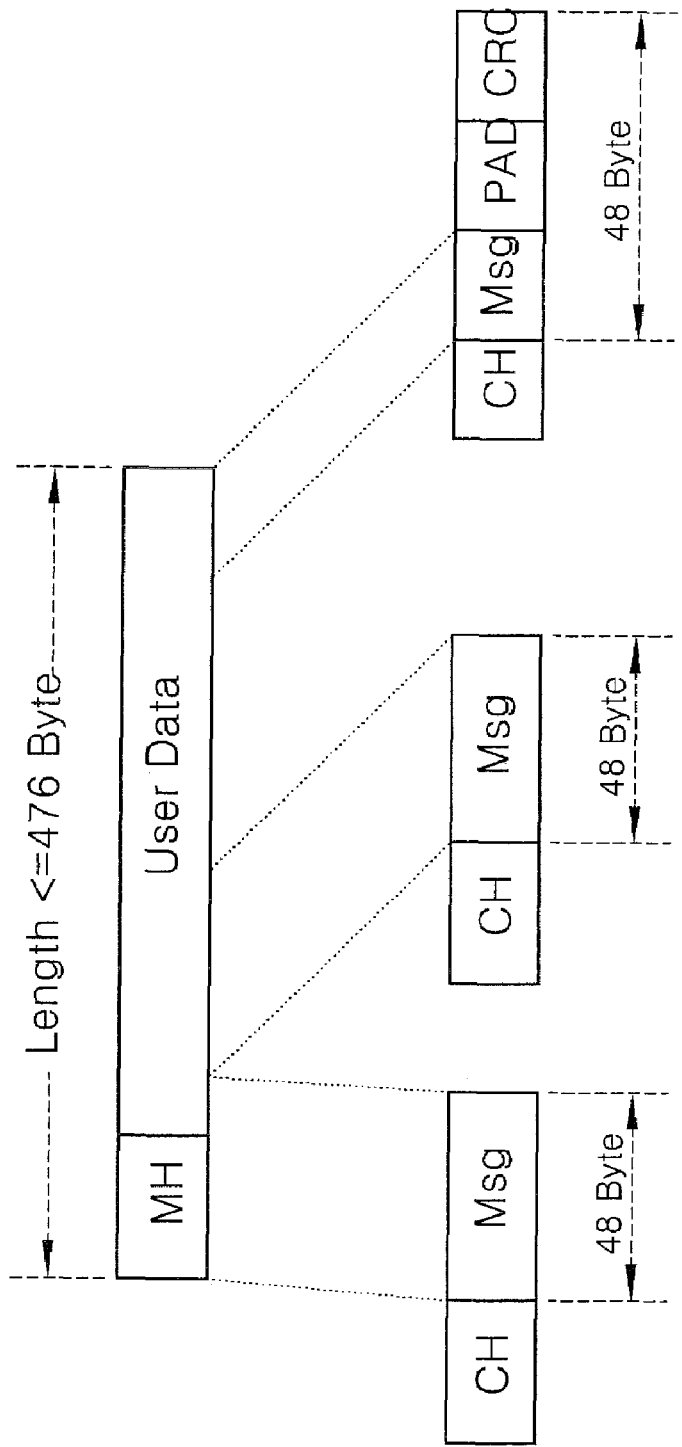
FIG. 7 illustrates a cell generating process according to an embodiment of the present invention.

FIG. 7 illustrates a process of generating ATM cell from the message in the ATM-based data transmitting and receiving device according to an embodiment of the present invention. As shown in FIG. 7, the message format stored in the transmitter data buffer 211 includes a message header MH and a user data area. As described above, the message header includes VPI/VCI and a message length area as described above. The maximum message stored in the user data area is 476-bytes.

The cell generator 212 initializes a read counter value based on the message format stored in the transmitter data buffer using the message length information. The cell generator 212 fetches the data stored in the user data area one byte at a time. The cell generator 212 decreases the read counter value by 1, whenever one byte of data is fetched. The cell generator 212 generates cell data using VPI/VCI. The fetched data are divided into 48-byte units and 48-byte units are combined with the cell header CH, which is generated in advance, to form one ATM cell.

Additional ATM cells are generated continually until the read counter value goes to 0. Payload Type (PT) information is set in the cell header CH to determine payload type whenever ATM cells are generated. The PT information can be set to '0' or '1'. For example, when the PT information is set to '0', it represents that more cells for a message exist. However, when the PT information is set to '1', it represents that the current cell is the last cell.

The PT information is a parameter that is variable whenever the ATM cell is generated. Accordingly, since the cell generator 212 can repeatedly use the cell header information as well as the PT information until the last cell of the message is transmitted, the cell header information can be stored in a cell header register. Likewise, the PT information can be combined with the cell header information stored in the cell header register to generate one ATM cell whenever the 48-byte cell is combined with the cell header CH.

If the read counter value becomes 0 before the data is divided into a 48-byte unit, the cell generator 212 adds some PAD data to form the 48-byte data unit and generates one ATM cell. For example, when PAD data is added the PT information is set to '1' indicating the current cell is the last cell of the message, as illustrated in FIG. 7.

The calculation processing modules 100 and 150 and the cell generator 212 each have authority to access the transmitter data buffer simultaneously. For example, the priority to access the transmitter data buffer 211 can be determined using a flag. In other words, if the flag is set to 0, the calculation processing modules 100 and 150 can access the transmitter data buffer 211. However, if the flag is set to 1, the cell generator 212 can access the transmitter data buffer 211. Accordingly, if the message is first stored in the transmitter data buffer, the flag will be set to 0. The calculation processing modules 100 and 150 can check the flag to determine whether the flag is set to 0. If the flag is set to 0, the calculation processing module stores the message in the transmitter data buffer and the flag is set to 1.

Then, the cell generator 212 determines whether the message is stored in the transmitting buffer. In other words, if the flag is set to 1, the cell generator 212 recognizes that the message is stored in the transmitter data buffer, and generates the ATM cells successively using the stored message. When the last message cell is processed, the cell generator 212 sets the flag to 0 so that the calculation processing module stores the message in the transmitter data buffer.

Referring to FIG. 4, the cell transmitter 213 uses a physical layer for successively transmitting a 53-byte ATM cell generated by the cell generator to an ATM switch module 300. The cell transmitter 213 can comprise an equalizer, a synchronizing circuit and a line decoding circuit.

Referring to FIG. 3, the ATM switch module 300 allocates an output port to the ATM cells received from the transmitting and receiving modules 200 and 250 according to VPI/VCI information, and switches each of the cells to desired destination at ATM level.

Each of the data receivers 220 and 270 comprises a cell receiver 221, a memory controller 222, a memory 223, a data restoring unit 224 and a receiver data buffer 225 as shown in FIG. 5. The cell receiver 221 receives ATM cells switched by the ATM switch module 300 and provides them to the memory controller 222. The cell receiver 221 is a physical layer as is the cell transmitter 213 of FIG. 4. The memory controller 222 controls the memory according to the VPI/VCI information that exists in the cell header of the received ATM cell. In other words, the memory controller 222 divides the ATM cell received from the ATM switch module 300 into the cell header and data, fetches a cell buffer identifier using VPI/VCI information that exists in the cell header, and stores the 48-byte data in the linked cell buffer indicated by the cell buffer identifier. Then, the memory controller 222 accesses a receiving state table and updates the contents of the receiving state table. If the received current cell is the last cell of the message, the updated contents are copied to a receiving completion state queue.

Figure 8:
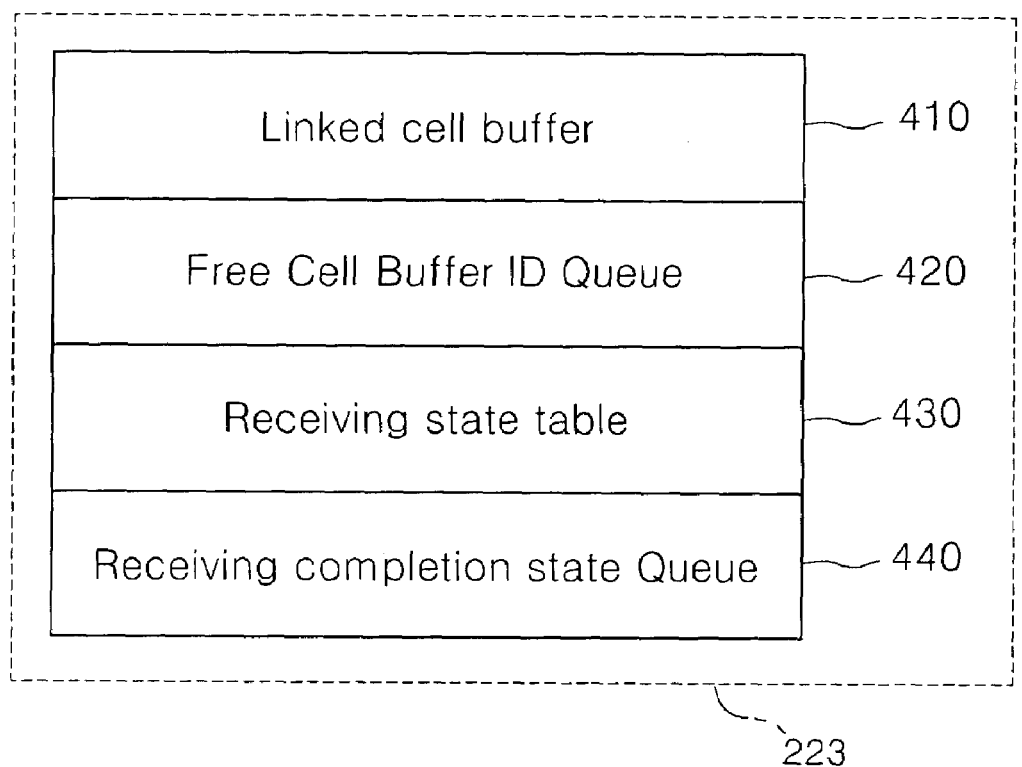
FIG. 8 illustrates a configuration of the memory shown in FIG. 5.
Figure 9:
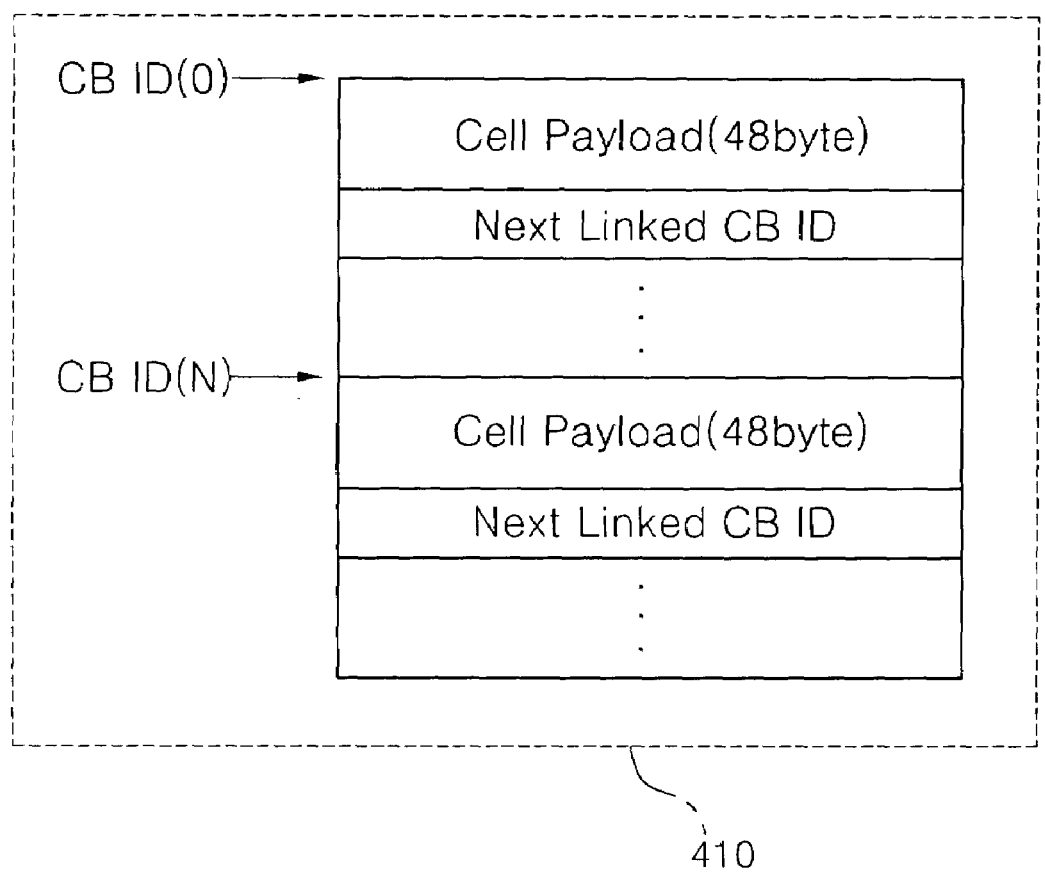
FIG. 9 illustrates a format of the linked cell buffer shown in FIG. 8.

To accomplish the above-described operation, the memory 223 can include a linked cell buffer 410, a free cell buffer identifier queue 420, a receiving state table 430 and a receiving completion state queue 440 as illustrated in FIG. 8. The memory shown in FIG. 8 will be described in detail with reference to FIGS. 9 to 12.

The linked cell buffer 410 is an area in which data of the received ATM cell are stored. The linked cell buffer can have 2048 blocks, each of which includes 64 bytes for storing a cell. Accordingly, in this configuration, a maximum of 2048 cells containing data can be stored. Here, the 64-byte block includes a payload area in which data are stored, and a next linked cell buffer identifier. The next linked buffer identifier indicates the cell buffer in which the next data connected to the current data is being stored. The next linked cell buffer identifier is information that connects ATM cells constituting one message, and corresponds to a cell buffer identifier indicating the block in which the data following the data stored in the block indicated by one cell buffer identifier are stored.

For example, if the cell buffer identifier of the block of the cell buffer in which the current data are stored is '13' and the next linked cell buffer identifier is '15', the next received cell data are stored in the block of the cell buffer indicated by the next linked cell buffer identifier '15'. A cell buffer identifier indicates each of the blocks. The cell buffer identifier is stored in the free cell buffer identifier queue 420. The memory controller 222 withdraws the cell buffer identifier and the data are stored in the linked cell buffer indicated by the corresponding cell buffer identifier.

Figure 10:
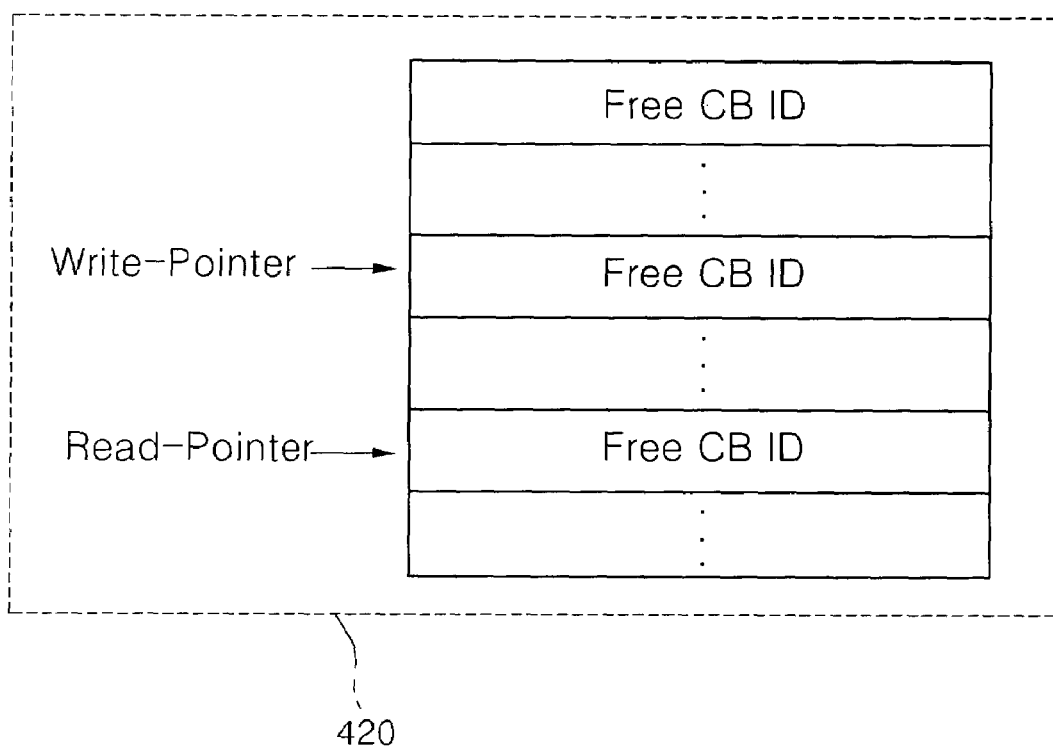
FIG. 10 illustrates a format of the free cell buffer identifier queue shown in FIG. 8.

The free cell buffer identifier queue 420 stores cell buffer identifiers in each block of an empty linked cell buffer as shown in FIG. 10. The free cell buffer identifier queue 420 can store as many cell buffer identifiers as the number of the blocks of the linked cell buffer. In other words, 2048 cell buffer identifiers can be stored in the free cell buffer identifier queue.

The memory controller 222 withdraws the cell buffer identifiers stored in the free cell buffer identifier queue one at a time and stores data of each cell in the linked cell buffer 410 whenever the ATM cells are received. If the data restoring unit 224 restores one message from data stored in the linked cell buffer, the corresponding cell buffer identifiers is returned to the free cell buffer identifier queue.

In this case, when the cell buffer identifier stored in the free cell buffer identifier queue is withdrawn, a read pointer can be used. When the cell buffer identifier stored in the free cell buffer identifier queue is returned, a write pointer can be used, for example, as illustrated in FIG. 10.

Figure 11:
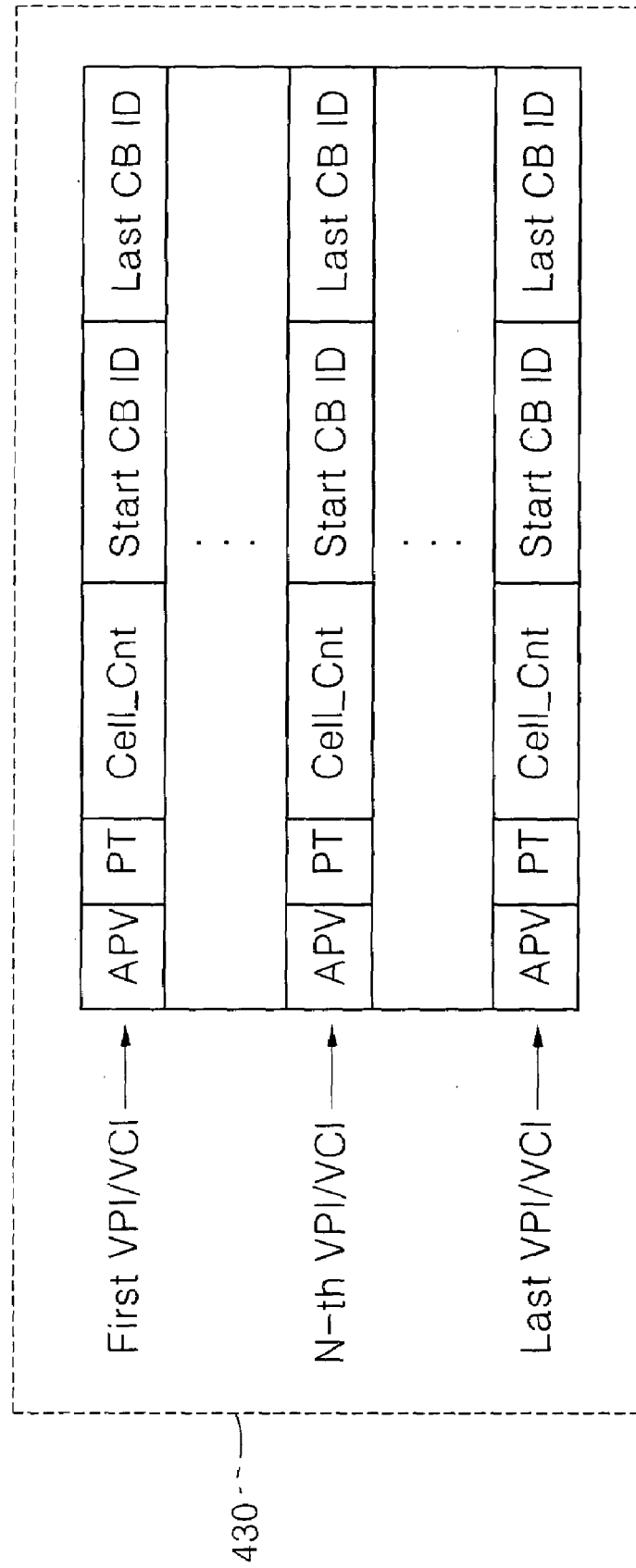
FIG. 11 illustrates a format of the receiving state table shown in FIG. 8.

The receiving state table 430 stores information for classifying and managing the cells to be transmitted from nodes according to the transmitting nodes as shown in FIG. 11. This information includes receiving approval information (APV), payload type (PT) information, cell number information (Cell_Cnt), and a cell buffer identifier information (Start CB ID) for a linked cell buffer in which a first cell is stored. Additionally, the information includes cell buffer identifier information (Last CB ID) for a linked cell buffer in which a last cell is stored. The receiving approval information tells whether the current cell can be approved to be received. The PT information tells whether the current cell follows a previous cell or is the last cell.

The cell number information Cell_Cnt tells the order number of the current cell among the cells received for one message. The start cell buffer identifier Start CB ID is the cell buffer identifier indicating the linked cell buffer in which the first cell is stored for one message. The last cell buffer identifier Last CB ID is the cell buffer identifier indicating the linked cell buffer in which the last cell is stored for one message. The start cell buffer identifier Start CB ID and the last cell buffer identifier Last CB ID are the cell buffer identifiers fetched from the free cell buffer identifier queue when the first cell and the last cell are received.

Figure 12:
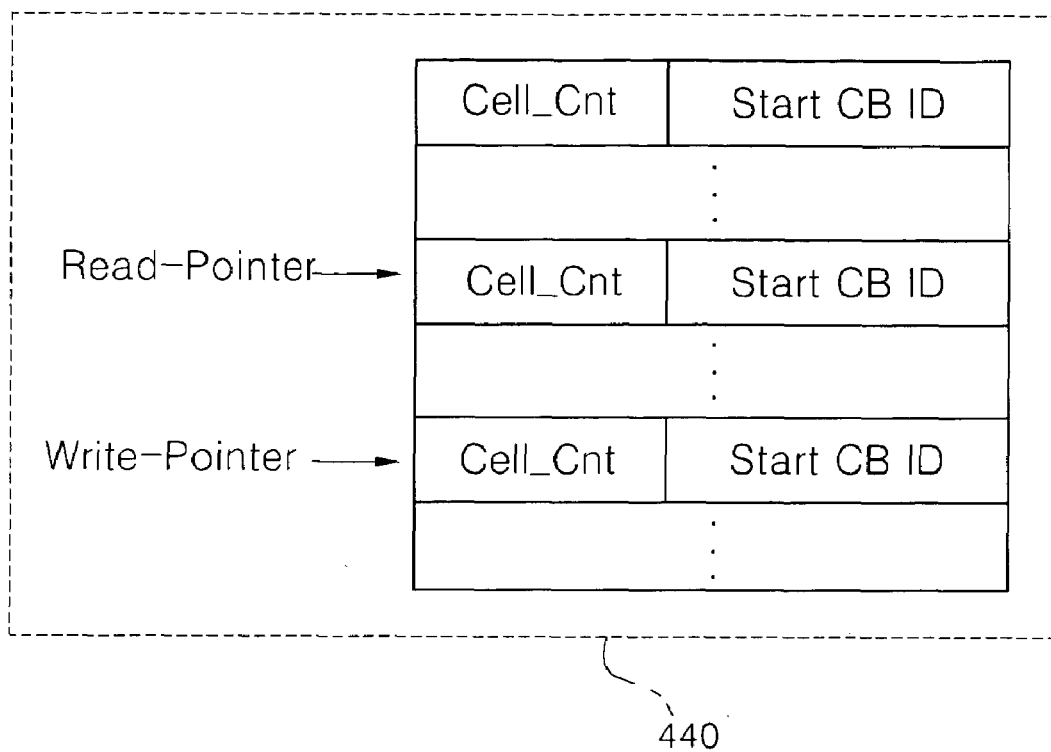
FIG. 12 illustrates a format of the receiving completion state queue shown in FIG. 8.

When one message is completely received, the receiving completion state queue 440 copies and stores some of the information of the receiving state table 430 in which information is updated and stored as shown in FIG. 12. In other words, the receiving completion state queue 440 includes the cell number information (Cell_Cnt), as illustrated in FIG. 12 of items of the receiving state table and the start cell buffer identifier information (Start CB ID) as illustrated in FIG. 12. The receiving completion state queue 440 is used when the message is restored by the data restoring unit 324.

Accordingly, when one ATM cell is received by the cell receiver 221, the memory controller 222 divides the 53-byte ATM cell into a 5-byte cell header and 48-byte data, checks the cell header, refers to VPI/VCI information, and accesses items of the receiving state table 430 corresponding to VPI/VCI information in memory 223. If there is not an item corresponding to the VPI/VCI information in the receiving state table 430, the corresponding data are discarded.

The memory controller 222 determines whether the corresponding data can be received using the receiving approval information APV of items corresponding to the VPI/VCI information. For example, if APV is set to '0', the corresponding data are not approved to be received. If APV is set to '1', the corresponding data are approved to be received.

When APV is set to '1' and the corresponding data are approved to be received, the memory controller 222 fetches one empty cell buffer identifier from the free cell buffer identifier queue 420 of the memory 223, and stores the corresponding data in the cell buffer indicated by the corresponding cell buffer identifier in the linked cell buffer 410. Then, the read pointer of the free cell buffer identifier queue 420 increases by 1.

The memory controller 222 determines whether the current received data follows the previous received data according to the PT information of the cell header of the received ATM cell. In other words, if the PT information is '0', the current received data is a continuing part of one message. On the contrary, if the PT information is '1', the current received data is the last data of the message.

As a result of this determination, if the PT information is '0', memory controller 222 records the corresponding cell buffer identifier and PT information in the corresponding item of the receiving state table 430. The cell number Cell_Cnt of the receiving state table 430 is increased by 1 and stored.

The memory controller 222 divides the next received ATM cell into a cell header and data as described above, fetches a second cell buffer identifier from the free cell buffer identifier queue 420, and stores data in the linked cell buffer 410 indicated by the corresponding cell buffer identifier. Then, the second cell buffer identifier is recorded on the next linked cell buffer identifier area provided to the cell buffer in which the previous data is stored. The memory controller 222 updates each item of the receiving state table 430 using the second cell buffer identifier and the PT information of the cell header. The second cell identifier is stored in the last cell buffer identifier area of the receiving state table 430.

As described above, when ATM cells are received successively, each of the cells is stored in the corresponding cell buffers and PT information, cell number information and last cell buffer identifier information are updated in the receiving state table. This process continues until the corresponding PT information is 1.

If the corresponding cell is the last cell of a message, the cell number information and start cell buffer identifier information of the information updated in the receiving state table queue 430 are copied to items indicated by the write pointer of the receiving completion state queue 440. Accordingly, the receiving completion state queue 440 increases by 1. As described above, when the PT information is set to 1 and the last cell of one message is stored in the linked cell buffer 410, the write pointer of the receiving completion state queue 440 also increases by 1.

The data restoring unit 224 checks the state of the receiving completion state queue 440. In other words, the data restoring unit 224 compares a read pointer of the receiving completion state queue 440 with a write pointer of the receiving completion state queue 440 and determines whether the read pointer matches the write pointer. If the read pointer matches the write pointer, the receiving completion state queue 440 is empty. If the read pointer does not match the write pointer, the receiving completion state queue 440 is not empty. Thus, the cell number information and the start cell buffer identifier for one message that is completely received are recorded.

If the receiving completion state queue 440 is not empty, the data restoring unit 224 fetches a start cell buffer identifier from the receiving completion state queue 440, and stores the data stored in the linked cell buffer 410 indicated by the start cell buffer identifier in the receiver data buffer 225. The data restoring unit 224 returns the start cell buffer identifier to the free cell buffer identifier queue 420 and decrease the cell number information of the receiving completion state queue 440 by 1. When the start cell buffer identifier is stored in the free cell buffer identifier queue 420, the corresponding write pointer increases by 1.

The data restoring unit 224 determines whether the cell number information is 0. If the cell number information is not 0, the next linked cell buffer identifier is fetched from the linked cell buffer indicated by the start cell buffer identifier. The data restoring unit 224 fetches the corresponding data from the linked cell buffer indicated by the next linked cell buffer identifier, and stores the corresponding data in the receiver data buffer 225.

The data restoring unit 224 returns the next linked cell buffer identifier to the free cell buffer identifier queue 420, and decreases the cell number information by 1. Also, the write pointer of the free cell buffer identifier queue 420 increases by 1. As described above, the process to withdraw the corresponding data from the linked cell buffer 410 and store the corresponding data in the receiver data buffer 225 is repeated until the cell number information goes to 0.

Figure 13:
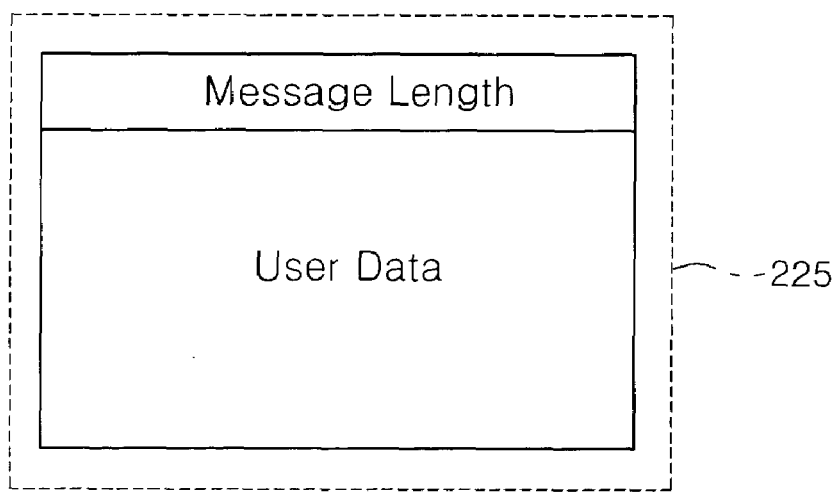
FIG. 13 illustrates a format of data stored in the receiver data buffer shown in FIG. 3.

If the cell number information is 0, all the data included in one message is withdrawn from the linked cell buffer 410. Thus, the message is stored in the receiver data buffer 225 as illustrated in FIG. 13. Thus, the data restoring unit 224 generates an interrupt or sets the register representing whether a message exists to 1 in order to inform the calculation processing module 100 and 150 that a new message is stored in the receiver data buffer.

The calculation processing modules 100 and 150 recognize that new data is stored in the receiver data buffer 225 using the interrupt signal provided from the data restoring unit 224 or the register set to '1'. Then, the calculation processor modules 100 and 150 fetch the message length information from the receiver data buffer 225, which is illustrated in FIG. 13. The calculation Process modules 100 and 150 decrease the byte number corresponding to the size of the message length area. In other words, the decreased byte number corresponding to the size of the message length area in the message length information is the remaining byte size of the message.

Accordingly, the calculation processing modules 100 and 150 read out data corresponding to the number of bytes of the message (e.g., message size). Then, the calculation processing modules 100 and 150 send a response signal for the interrupt to the data restoring unit 224 or set the register to '0'. The calculation processing modules 100 and 150 and the data restoring unit 224 can determine whether they have the authority to access to the receiver data buffer using a flag.

As described above, the ATM-based data transmitting and receiving device and method of embodiments the present invention reduce load on a calculation processing module by using separate means for transmitting and receiving ATM cells. In contrast, the related art has a calculation processing module that divides a message, generates the cell and restores one message using received cells. To reduce the load of the calculation processing module, a data transmitting and receiving device including additional devices (e.g. an ASIC) can be provided between the calculation processing modules 100 and 150, in embodiments of the present invention. Accordingly, the load of the calculation processing device can be reduced so that the transmission efficiency of the ATM cell is improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

For example, the invention has been described in connection with a number of exemplary embodiments. To facilitate an understanding of the invention, many aspects previously described in terms of sequences of actions to be performed can be performed by specialized circuits (e.g., ASIC, discrete logic gates interconnected to perform a specialized function, and the like), by program instructions being executed by one or more processors, or by a combination of both. Thus, the various aspects of the invention may be embodied in many different forms, and all such forms are contemplated to be within the scope of the invention.

Additionally, those skilled in the art will appreciate that although the calculation processing modules and transmitting and receiving modules (or data communication modules) are illustrated as separate block diagrams, these modules can be integrated into one physical unit. For example, a transmitting and receiving module can be added as a daughter board that shares some resources with the calculation processing module or integrated directly into the calculation processing module. Accordingly, the foregoing description should not be construed to limit the invention. Therefore, the features of the appended claims and their equivalents define the scope of the invention.

What is claimed is:

1. An ATM-based device comprising:
   a data transmitter including
      a transmission data storage unit configured to store data received from a calculation processing module;
      a cell generator configured to divide a message stored in the transmission data storage unit into a predetermined amount of data, to combine the data using Virtual Path Identifier/Virtual Channel Identifier (VPI/VCI) information attached to the message to generate at least one ATM cell; and
a cell transmitter configured to transmit the at least one ATM cell generated at the cell generator to an ATM switch; and
a data receiver including
a cell receiver configured to receive the at least one ATM cell switched by the ATM switch module;
a memory controller configured to control storage of the at least one ATM cell received by the cell receiver to a corresponding cell buffer according to a cell buffer identifier;
a memory configured to store the at least one ATM cell;
a data restoring unit configured to retrieve the at least one ATM cell using the cell buffer identifier and to restore the message; and
a receiving data storage unit configured to store the message restored by the data restoring unit.

2. The device according to claim 1, wherein a cell header coupled to each of the data comprises PT information representing whether or not the divided data is the last data of the message.

3. The device according to claim 1, wherein the cell generator divides the data using a read counter initialized according to message length information attached to the message.

4. The device according to claim 1, wherein the cell generator is configured to change PT information of the ATM cell when a read counter is a predetermined minimum value.

5. The device according to claim 1, wherein the memory comprises:
a linked cell buffer configured to store one ATM cell and an identifier to a next linked cell buffer for each cell buffer identifier;
a free cell buffer identifier queue configured to store at least one cell buffer identifier indicating an empty linked cell buffer;
a receiving state table including information used in classifying and managing the ATM cell according to the VPI/VCI; and
a receiving completion state queue configured to copy a portion of information of the receiving state table which is updated when all the ATM cells comprising one message are stored.

6. The device according to claim 5, wherein the receiving state table includes at least one of receiving permission information, cell number information, start cell buffer identifier information, and last cell buffer identifier information.

7. The device according to claim 5, wherein the receiving completion state queue includes at least one of cell number information and start cell buffer identifier information.

8. The device according to claim 1, wherein the memory controller is configured to determine whether or not to approve the reception of the at least one ATM cell using receiving permission information of a receiving state table corresponding to VPI/VCI information attached to the at least one ATM cell, and to store the at least one ATM cell in the linked cell buffer using a cell buffer identifier retrieved from a free cell buffer identifier queue.

9. The device according to claim 1, wherein the memory controller is configured to retrieve another cell buffer identifier from a free cell buffer identifier queue, to store the received ATM cells, and to store a next cell buffet identifier in a next linked cell buffer identifier area provided in an area that stores a previous ATM cell, if the PT information of the received ATM cell is a predetermined minimum value.

10. The device according to claim 1, wherein, in the memory controller, the cell number increases and is stored in the receiving state table whenever the ATM cell is stored in the linked cell buffer.

11. The device according to claim 1, wherein the data restoring unit is configured to compare a read pointer with a write pointer in the receiving completion state queue and to determine whether the at least one ATM cell is stored in the linked cell buffer.

12. The device according to claim 1, wherein the data restoring unit is configured to retrieve a start cell buffer identifier from a receiving completion state queue, to store corresponding data stored in a cell buffer indicated by a start cell buffer identifier in the receiving data storage unit, and to decrease cell number information of the receiving completion state queue.

13. The device according to claim 12, wherein data are successively retrieved from the cell buffer and stored in the receiving data storage unit until the cell number becomes 0.

14. The device according to claim 1, wherein the data restoring unit is configured to return the cell buffer identifier indicating each cell buffer to a free cell buffer identifier queue whenever retrieving data from the linked cell buffer.

15. An ATM apparatus comprising:
a first calculation processing module; and
a first data communication module coupled to the first calculation processing module, wherein the first data communication module includes:
a transmitter including: a data buffer configured to store a message from the first calculation processing module; a cell generator configured to generate at least one ATM cell from the message; and a cell transmitter configured to transmit the at least one ATM cell;
an ATM switch configured to relay the at least one ATM cell transmitted from the first data communication module;
a second calculation processing module; and
a second data communication module coupled to the second calculation processing module, wherein the second data communication module includes a receiver including: a cell receiver configured to receive the at least one ATM cell from the ATM switch; a memory controller configured to control storage of the at least one ATM cell received by the cell receiver in a memory; a data restoring unit configured to retrieve the at least one ATM cell from the memory and to restore the message; and a receiver buffer configured to store the message restored by the data restoring unit and to allow communication of the message with the second calculation processing module.

16. The apparatus of claim 15, wherein the cell generator is configured to divide data from the message into predetermined data portions and to combine each data portion with a cell header to form an ATM cell, and wherein the cell header is generated using Virtual Path Identifier/Virtual Channel Identifier (VPI/VCI) information of the message.

17. The apparatus of claim 15, wherein the memory comprises:
a linked cell buffer configured to store the at least one ATM cell and an identifier to a next linked cell buffer;
a free cell buffer identification queue configured to store at least one cell buffer identifier indicating at least one empty cell buffer;
a receiving state table configured to store information used for management of the at least one ATM cell; and receiving completion state queue configured to copy a portion of information from the receiving state table when all ATM cells comprising one message are received and stored.

18. The apparatus of claim 17, wherein the information in the receiving state table includes at least one of:
   approval information that indicates if the ATM cell is approved to be received;
   a payload type that indicates if the ATM cell is a last cell of the message;
   a cell number that indicates an order of the ATM cell among cells received for one message;
   a start cell buffer identifier that indicates a linked cell buffer in which a first cell is stored for the message; or
   a last cell buffer identifier that indicates a linked cell buffer in which a last cell is stored for the message.

19. The apparatus of claim 17, wherein the receiving completion state queue includes at least one of cell number information or start cell buffer identifier information.

20. The apparatus of claim 17, wherein the memory controller is configured to determine whether or not to approve the reception of the at least one ATM cell using receiving permission information of the receiving state table corresponding to VIPI/VCI information attached to the at least one ATM cell, and to store the at least one ATM cell in the linked cell buffer using a cell buffer identifier retrieved from a free cell buffer identifier queue.

21. The apparatus of claim 17, wherein the memory controller is configured to retrieve a next cell buffer identifier from a free cell buffer identifier queue, to store a next received ATM cell, and to store a next cell buffer identifier in a next linked cell buffer identifier area provided in an area that stores a previous ATM cell, if payload type (PT) information of the received ATM cell includes a predetermined value.

22. The apparatus of claim 15, wherein the memory controller is configured to increase the cell number and to store the cell number in a receiving state table if the ATM cell is stored in the linked cell buffer.

23. The apparatus of claim 15, wherein the data restoring unit is configured to compare a read pointer with a write pointer in the receiving completion state queue and to determine whether the at least one ATM cell is stored in the linked cell buffer.

24. The apparatus of claim 15, wherein the data restoring unit is configured to retrieve data from the memory and store the data in the receiver buffer to restore the message.

25. The apparatus of claim 24, wherein the data restoring unit is configured to sequentially retrieve data from the memory and to sequentially store data in the receiver buffer until a cell number indicator in the memory becomes a predetermined minimum value.

26. The apparatus of claim 24, wherein the message comprises message length information and user data.

27. The apparatus of claim 15, wherein the first data communication module further comprises a receiver and wherein second data communication module further comprises a transmitter.

* * * * *